A. AMORY.
Improvement in Railroad Car-Starters.
No. 115,266.  Patented May 30, 1871.
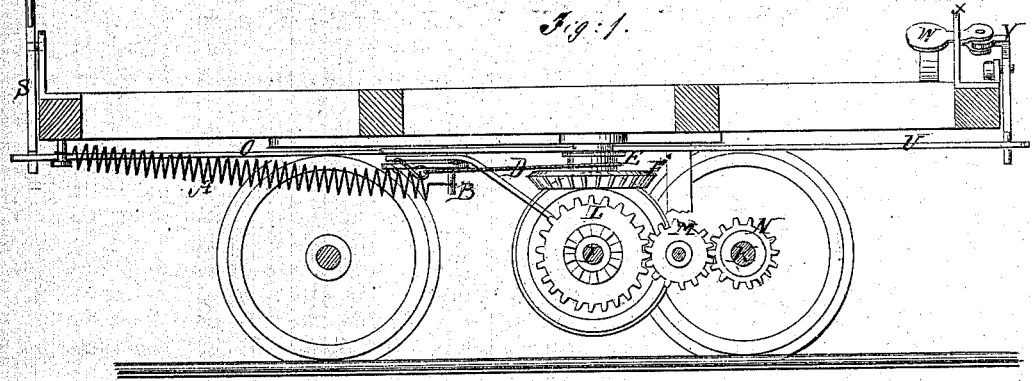
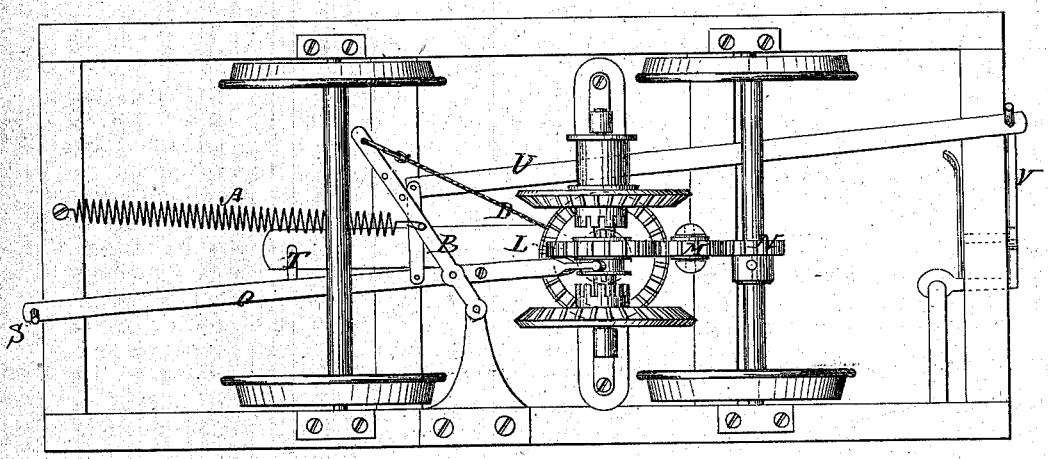
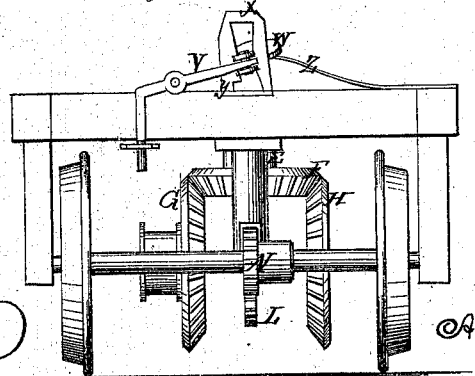
Witnesses:
Chas. Nida
Wm. H. C. Smith.
Inventor:
A. Amory
PER
Attorneys.

UNITED STATES PATENT OFFICE.

ARTHUR AMORY, OF NEW YORK, N. Y.

IMPROVEMENT IN RAILROAD-CAR STARTERS.

Specification forming part of Letters Patent No. 115,266, dated May 30, 1871.

*To all whom it may concern:*

Be it known that I, ARTHUR AMORY, of the city, county, and State of New York, have invented a new and Improved Car-Starter; and I do hereby declare that the following is a full, clear, and exact description thereof, which will enable others skilled in the art to make and use the same, reference being had to the accompanying drawing forming part of this specification.

This invention relates to improvements in attachments to street and other cars for storing up the power expended in stopping them for use in starting the car again; and it consists in the arrangement of gears and shifting apparatus with one of the axles and a spring, for causing the spring to arrest the car by being stretched by the winding of a cord or chain on a drum, and when starting, the gears being properly shifted, to expend the power thus stored up in it to set the car in motion, all as hereinafter described.

Figure 1 is a longitudinal sectional elevation of a part of a car, showing my arrangement of stopping and starting apparatus; Fig. 2 is a plan of the bottom of the car; and Fig. 3 is an end view.

Similar letters of reference indicate corresponding parts.

A is a strong spring, preferably of the coiled-wire form, to be used as a brake for arresting the motion of the car and for assisting to start it again. Said spring is connected to the frame of the car at one end, and at the other to a lever, B, one end of which is pivoted to the frame, as at C, and the other end is connected by a cord or chain, D, with a drum, E, for winding it on or off. Said drum is suspended on a vertical stud projecting downward from the bottom of the car, and has a bevel-wheel, F, on the lower end gearing with two wheels, G H, on a horizontal counter-shaft, I, parallel and near to the axle K. These wheels G H are fitted, at the ends of their hubs facing each other, to clutch with a sliding wheel, L, on the said counter-shaft between them, and gearing with the axle K by means of the idler-wheel M and the pinion N. The wheel L is shifted by the forked lever O pivoted to the frame at P, engaging the said wheel by its forked end working in the groove of the hub, and connected at the other end with a vibrating lever, S, rising up in front of the platforms, to be manipulated by the attendant. Said lever has a spring pawl, T, connected with it for dropping into notches in a plate or catch of any kind for holding it at either end of its movement, but so arranged that it will escape from either notch readily when the lever S is moved. A notch is also provided in the said plate, between the two, for holding the lever at either end of the movement, for holding it half way for keeping the wheel L out of gear with the wheels G H, so that it may run free when the car runs. It will be seen that by moving the hand-lever S in the right direction when the car is to be stopped, the drum E will be set in motion in the direction to wind up the spring, and that previous to starting, the lever being suddenly thrown in the other direction, the drum will be so geared as to unwind and release the spring, so that its recoiling power is expended on the axle in the direction to set the car in motion or to accelerate it. U represents a lever-connection with O, showing a plan for shifting the wheel L by the foot of the attendant. Said lever is connected at the end of the platform with a cranked-lever, V, having a foot-piece, W, pivoted to the end of its long arm so as to swing in the horizontal plane of the said long arm. The shank of said piece works vertically in a slotted guide, X, having a notch, Y, in one side for engaging it and holding it down. Z is a spring arranged under the foot-piece W for throwing it up. The said foot-piece, being forced down by the foot to move the levers and wheel L in one direction, may be vibrated by the foot and by the aid of the spring to engage with the notch Y to retain the wheel; then for moving it in the other direction the said foot-piece is detached from the catch by the foot, and the spring throws it back and shifts the lever over the other way. Instead of the spring-pawl T, I may employ a sliding bolt on the lever O to be forced against a curved notched bar by a spring to hold said lever; or any other equivalent holding device may be employed. I may attach the cord directly to the end of the spring and dispense with lever B, but I prefer to employ the lever, for the spring works better when not expanding and contracting as much as it would have to if so connected. I propose to make the pinion N in halves, with clamping-bolts for attaching it to any axle in use readily, and to arrange the other devices so that the whole may be readily applied to cars now in use.

Having thus described my invention, I claim as new, and desire to secure by Letters Patent—

1. The arrangement, with the axle K and spring A, of the sliding wheel L, lever O, brake-lever S, the idler-wheel M, pinion N, gear-wheels G H, wheel F, drum E, and cord D, as shown and described.

2. The combination, with the shifting lever U, of the bell-cranked lever V, pivoted foot-piece W, spring Z, and the notched guide X, all substantially as specified.

The above specification of my invention signed by me this 3d day of April, 1871.

ARTHUR AMORY.

Witnesses:
C. L. TOPLIFF,
GEO. W. MABEE.